(12) United States Patent
Kim et al.

(10) Patent No.: US 10,807,056 B2
(45) Date of Patent: Oct. 20, 2020

(54) HIGH PRESSURE HOMOGENIZER AND METHOD FOR MANUFACTURING GRAPHENE USING THE SAME

(71) Applicant: LG Chem, Ltd., Seoul (KR)

(72) Inventors: Eun Jeong Kim, Daejeon (KR); Kwang Hyun Yoo, Daejeon (KR); Ye Hoon Im, Daejeon (KR); Jin Yeong Lee, Daejeon (KR); Won Jong Kwon, Daejeon (KR)

(73) Assignee: LG Chem, Ltd. (KR)

( * ) Notice: Subject to any disclaimer, the term of this patent is extended or adjusted under 35 U.S.C. 154(b) by 267 days.

(21) Appl. No.: 16/076,192

(22) PCT Filed: May 8, 2017

(86) PCT No.: PCT/KR2017/004754
§ 371 (c)(1),
(2) Date: Aug. 7, 2018

(87) PCT Pub. No.: WO2017/196037
PCT Pub. Date: Nov. 16, 2017

(65) Prior Publication Data
US 2020/0122108 A1  Apr. 23, 2020

(30) Foreign Application Priority Data

May 11, 2016  (KR) .................. 10-2016-0057535

(51) Int. Cl.
*B01J 3/00* (2006.01)
*B01F 13/00* (2006.01)
(Continued)

(52) U.S. Cl.
CPC ........... *B01J 3/002* (2013.01); *B01F 13/0061* (2013.01); *B01J 3/062* (2013.01); *B01J 19/0093* (2013.01);
(Continued)

(58) Field of Classification Search
CPC ........ B01J 3/002; B01J 3/062; B01J 19/0093; B01J 2203/061; B01J 2219/00792;
(Continued)

(56) References Cited

U.S. PATENT DOCUMENTS 5,690,763 A    11/1997 Ashmead et al.
2004/0034111 A1  2/2004 Tonkovich et al.
(Continued)

FOREIGN PATENT DOCUMENTS

EP    2495216 A2   9/2012
JP    H08508197 A  9/1996
(Continued)

OTHER PUBLICATIONS

Nacken, et al., Delamination of graphite in a high pressure homogenizer, RSC Adv. 2015; 5: 57328-57338 (Year: 2015).*

(Continued)

*Primary Examiner* — Daniel C. McCracken
(74) *Attorney, Agent, or Firm* — Lerner, David, Littenberg, Krumholz & Mentlik, LLP

(57) ABSTRACT

The present invention relates to a high pressure homogenizer and a method for manufacturing graphene using the same, and according to one aspect of the present invention, there is provided a high pressure homogenizer comprising a channel module which comprises a microchannel through which an object for homogenization passes, wherein the channel module comprises at least one baffle disposed so as to partition the microchannel into a plurality of spaces and the baffle is provided so as to partition the microchannel into two spaces along the width direction or the height direction.

14 Claims, 4 Drawing Sheets

(51) Int. Cl.
*B01J 3/06* (2006.01)
*B01J 19/00* (2006.01)
(52) U.S. Cl.
CPC .. *B01J 2203/061* (2013.01); *B01J 2219/0086* (2013.01); *B01J 2219/00792* (2013.01); *B01J 2219/00889* (2013.01)
(58) Field of Classification Search
CPC ...... B01J 2219/0086; B01J 2219/00889; B01J 2219/00851; B01F 13/0061; B01F 5/10; B01F 13/0059; B01F 5/0664; C01B 32/19; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
See application file for complete search history.

(56) References Cited

U.S. PATENT DOCUMENTS

| 2007/0225532 | A1 | 9/2007 | Tonkovich et al. |
| 2008/0078446 | A1 | 4/2008 | Fujiwara |
| 2013/0052149 | A1 | 2/2013 | Tonkovich et al. |
| 2013/0189311 | A1 | 7/2013 | Rueckl et al. |
| 2017/0166449 | A1 | 6/2017 | Yoo et al. |

FOREIGN PATENT DOCUMENTS

| JP | 2006514878 A | 5/2006 |
| JP | 200886889 A | 4/2008 |
| JP | 2009530400 A | 8/2009 |
| JP | 2013512891 A | 4/2013 |
| JP | 5610765 B2 | 10/2014 |
| KR | 10-1264316 B1 | 5/2013 |
| KR | 2015-0076093 A | 7/2015 |
| KR | 20150076105 A | 7/2015 |
| WO | 2012139209 A1 | 10/2012 |

OTHER PUBLICATIONS

Panagiotou, et al., Deagglomeration and Dispersion of Carbon Nanotubes Using Microfluidizer® High Shear Fluid Processors, NIST-Nanotech 2008; 1: 39-42 (Year: 2008).*
Shang, et al., The facile fabrication of few-layer graphene and graphite nanosheets by high pressure homogenization, Chem. Comm. 2015; 51: 15811-15814 (Year: 2015).*
International Search Report From PCT/KR2017/004754 dated Jul. 28, 2017.
Nacken, T.J. et al., "Delamination of Graphite in a High Pressure Homogenizer," RSC Advances, 2015, vol. 5, No. 71, pp. 57328-57338 (online published: Jun. 23, 2015). See abstract; p. 57329; and figure 1.
Extended European Search Report including Written Opinion for Application No. EP17796337.8 dated May 6, 2019, pp. 1-7.

* cited by examiner

[Figure 1]
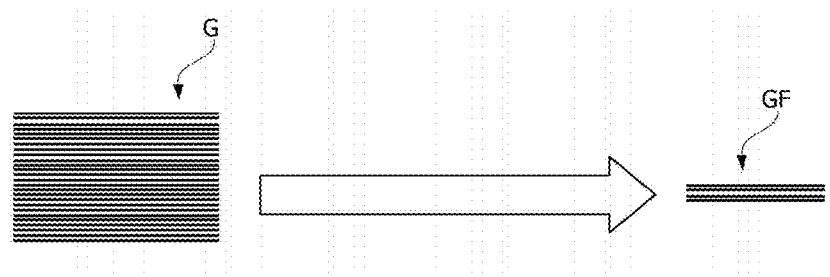
[Figure 2]
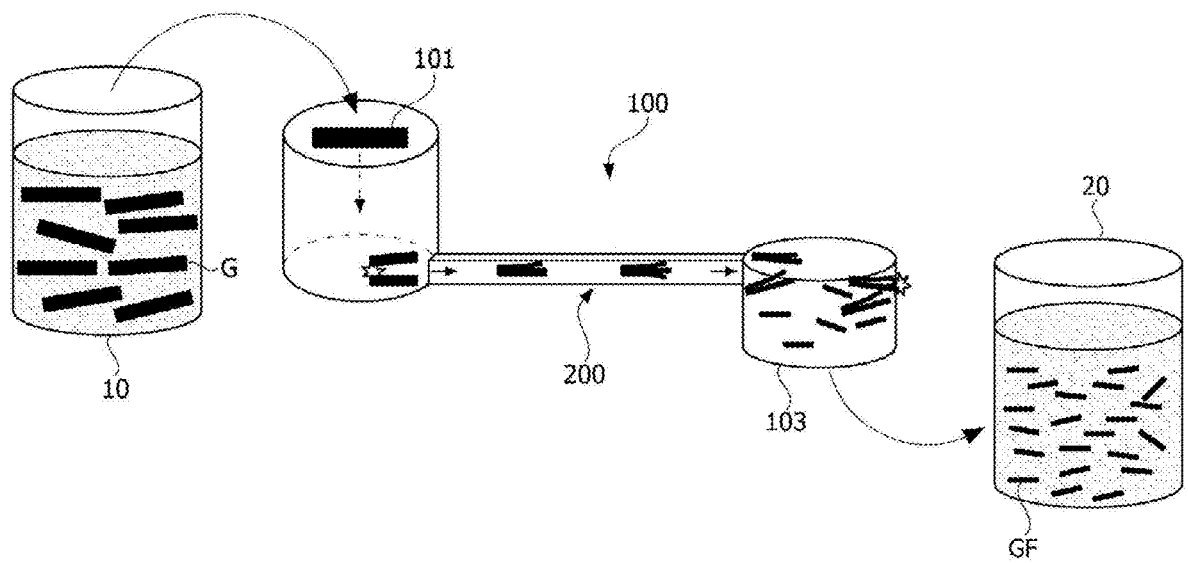

[Figure 3]
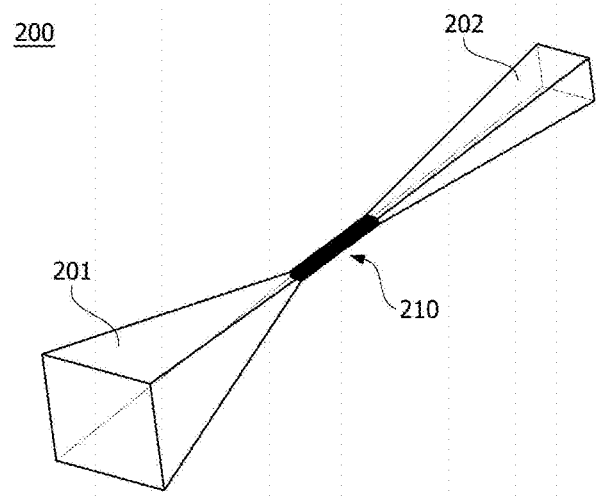
[Figure 4]
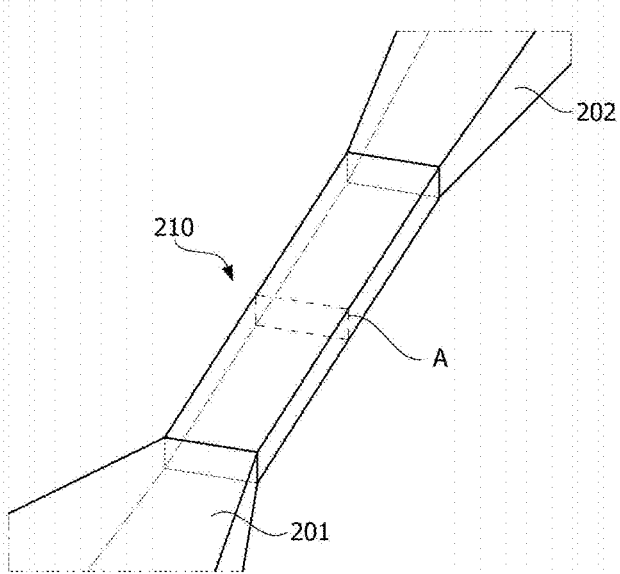

[Figure 5]
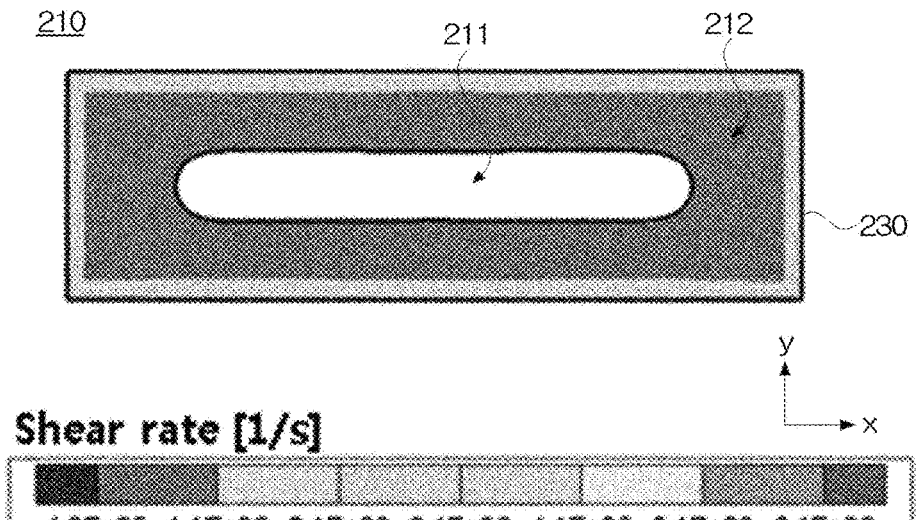
[Figure 6]
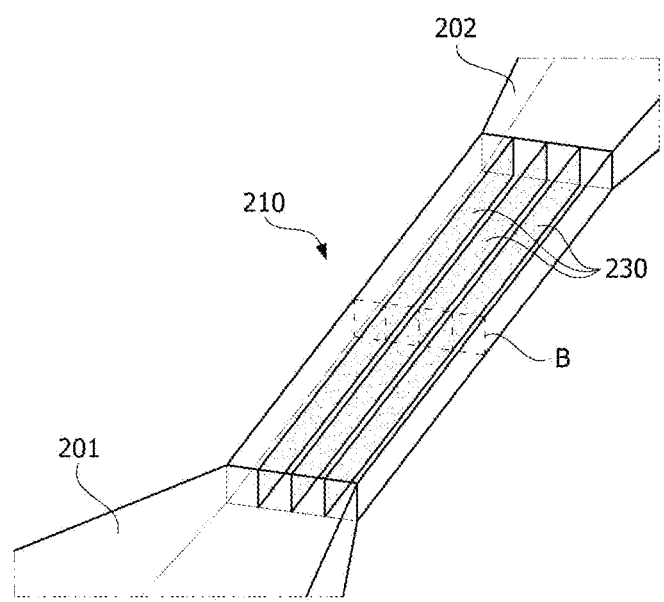

[Figure 7]
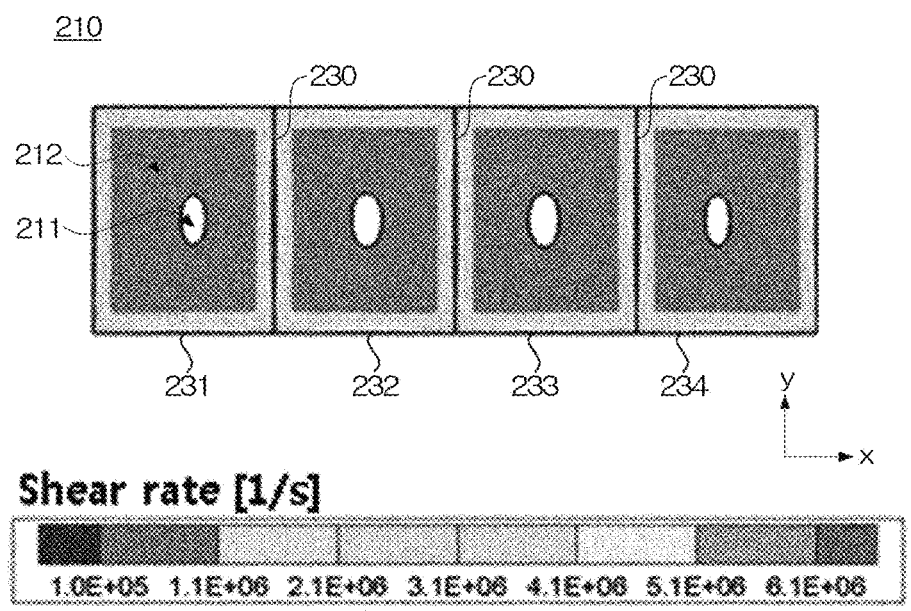

HIGH PRESSURE HOMOGENIZER AND METHOD FOR MANUFACTURING GRAPHENE USING THE SAME

CROSS-REFERENCE TO RELATED APPLICATIONS

This application is a national phase entry under 35 U.S.C. § 371 of International Application No. PCT/KR2017/004754, filed May 8, 2017, which claims priority to Korean Patent Application No. 10-2016-0057535, filed May 11, 2016, the disclosure of which are incorporated herein by reference.

TECHNICAL FIELD

The present invention relates to a high pressure homogenizer and a method for producing graphene using the same.

BACKGROUND ART

Graphene is a metalloid material with a thickness corresponding to a carbon atomic layer while forming a hexagonally connected arrangement of carbon atoms by sp2 bonds in two dimensions. Recently, a graphene sheet having one carbon atom layer has been reported to have very good electrical conductivity.

Due to the excellent properties of graphene, various methods have been proposed or studied to more effectively mass-produce graphene from carbon-based materials such as graphite. In particular, various studies have been made on a method for easily manufacturing graphene sheets or flakes having a thinner thickness and a larger area.

FIG. 1 is a conceptual diagram for explaining a process of producing graphene flakes (GF) (or graphene) through graphite (G).

A high pressure homogenizer (HPH) used as a method for producing graphene is a device in which a high pressure is applied to a microchannel having a micrometer scale diameter and thus a strong shear force is applied to a passing substance. Particularly, when graphite is exfoliated using the high pressure homogenizer, there is an advantage that a graphene production yield can be increased.

Specifically, when a high pressure homogenizer is used, the graphene is produced as graphite is exfoliated by a shear stress applied to the graphite while a graphite dispersion liquid propelled by ultra-high pressure passes through the microchannel. At this time, the graphite has a thickness of approximately several hundred nanometers, and the graphene has a thickness of approximately 2 to 30 nm.

On the other hand, for exfoliation of graphene, it is important to form a proper flow field in the microchannel so as to generate a shear stress at a level capable of breaking an interlayer bonding force. In the graphene exfoliation process using the high pressure homogenizer, the velocity gradient is increased near the wall surface inside the microchannel due to the adhesion condition of the wall surface, so that a large shear stress is generated. However, since the velocity gradient is small at the center portion to show a small shear stress, which is lower than the critical shear stress required for exfoliation, there is a problem that the exfoliation is not performed.

DISCLOSURE

Technical Problem

It is a problem to be solved by the present invention to provide a high pressure homogenizer capable of increasing an exfoliation effective region within a microchannel and a method for manufacturing graphene using the same.

Technical Solution

To solve the problem as described above, according to one aspect of the present invention, there is provided a high pressure homogenizer comprising a channel module which comprises a microchannel through which an object for homogenization passes, wherein the channel module comprises at least one baffle disposed so as to partition the microchannel into a plurality of spaces and the baffle is provided so as to partition the microchannel into two spaces along the width direction or the height direction.

Also, according to another aspect of the present invention, there is provided a high pressure homogenizer comprising a channel module which comprises a microchannel through which an object for homogenization passes, wherein the channel module comprises a front end channel for supplying the object to the microchannel, a back end channel in which the object passing through the microchannel flows into and at least one baffle disposed so as to partition the microchannel into a plurality of spaces, the baffle is provided so as to partition the microchannel into two spaces along the width direction or the height direction, the front end channel is provided so that at least a part of a flow area becomes small along the moving direction of the object and the back end channel is provided so that at least a part of a flow area increases along the moving direction of the object.

In addition, according to another aspect of the present invention, in a method for manufacturing graphene using the high pressure homogenizer, there is provided a method for manufacturing graphene comprising a step of supplying a solution containing graphite to the channel module and a step of applying pressure to the channel module to pass the solution containing graphite.

Advantageous Effects

As described above, the high pressure homogenizer related to at least one embodiment of the present invention and the method for manufacturing graphene using the same have the following effects.

According to the present invention, in the process of exfoliating a single layer of graphene from graphite using the high pressure homogenizer, productivity can be improved by increasing the exfoliation effective region in the microchannel.

Specifically, one or more baffles are disposed in the microchannel in order to increase the region to which a shear stress (shear rate) above the critical shear stress (for example, $10^5$ 1/s) required for graphene exfoliation is applied. By partitioning the inside of the microchannel by the baffle, the wall area can be increased and the exfoliation effective region showing large shear stress can be increased.

BRIEF DESCRIPTION OF DRAWINGS

FIG. 1 is a conceptual diagram for explaining the process of producing graphene flakes through graphite.

FIG. 2 is a conceptual diagram showing a high pressure homogenizer related to one embodiment of the present invention.

FIG. 3 is a perspective view showing the channel module shown in FIG. 2.

FIG. 4 is a perspective view showing a first embodiment of a channel module.

FIG. 5 is a simulation result at the portion A in FIG. 4

FIG. 6 is a perspective view showing a second embodiment of the channel module.

FIG. 7 is a simulation result at the portion B in FIG. 6.

MODE FOR INVENTION

Hereinafter, a high pressure homogenizer according to one embodiment of the present invention and a method for manufacturing graphene using the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 2 is a conceptual diagram showing a high pressure homogenizer (100) related to one embodiment of the present invention, and FIG. 3 is a perspective view showing the channel module (200) shown in FIG. 2.

Also, FIG. 4 is a perspective view showing a first embodiment of a channel module, and FIG. 5 is a simulation result at the portion A in FIG. 4.

The high pressure homogenizer (100) means a device in which a high pressure is applied to a microchannel (210) having a micrometer scale diameter and thus a strong shear force is applied to a substance (graphite dispersion liquid) passing therethrough. The shear stress is used to perform fragmentation and dispersion to the substance passing through the microchannel (210) and to produce a highly dispersed material.

On the other hand, since the high pressure homogenizer (100) is designed and manufactured for fragmentation and pulverization of substances through the strong shear stress, generally a very short microchannel is used. However, depending on the purpose of use of the high pressure homogenizer (100), a microchannel having a short length may serve as a disadvantage.

Particularly, in the case of manufacturing graphene by exfoliating graphite (G) with a high pressure homogenizer (100), like the present invention, when the microchannel having a short length is used, there is a problem that the productivity is lowered because the number of times of passage of the microchannel must be increased in order to produce thin and uniform graphene. Besides, if the length of the microchannel is short, the velocity of the fluid passing through the microchannel becomes fast, and the energy that a fluid collides with the wall surface of an outflow part (103) becomes high. Due to such a collision, there is a problem that the size of the graphene to be produced decreases because the graphene itself is pulverized. Therefore, the present invention provides a high pressure homogenizer capable of reducing the number of times of passage of the microchannel without pulverizing the graphene itself within a range where the shear stress required for graphite exfoliation is applied.

Referring to FIG. 2, the high pressure homogenizer (100) comprises a channel module (200) comprising a microchannel through which an object for homogenization passes. The object is the above-mentioned graphite (G). The high pressure homogenizer (100) comprises an inflow part (101) through which the object is supplied toward the channel module (200) and an outflow part (103) through which the object passing through the channel module (200) flows out. In FIG. 2, a reference numeral 10 denotes a container containing a graphite (G) dispersion liquid, and a reference numeral 20 denotes a container containing graphene (GF) recovered from the outflow part (103). In addition, the high pressure homogenizer (100) comprises a pump for generating a pressure for pressing the object to pass through the channel module (200). While the object passes through the microchannel (210) with the pressure generated by the pump, homogenization is achieved.

On the other hand, the channel module (200) comprises a front end channel (201) for supplying an object to the microchannel (210) and a back end channel (202) in which the object passing through the microchannel (201) flows into. At this time, the front end channel (201) is provided so that at least a part of the flow area becomes small along the moving direction of the object, and the back end channel (202) is provided such that at least a part of the flow area increases along the moving direction of the object. In addition, the microchannel (210) may be provided to have a constant flow area along the moving direction of the object.

In the present invention, the object is graphite (G), which is exfoliated by a strong shear stress (shear rate) in the microchannel (210) to produce graphene (GF). At this time, it is preferred for the length of the microchannel to be 2 mm to 1000 mm, in order that the shear force required for graphite exfoliation is applied, and at the same time, the section where the shear force is applied is lengthened, while the energy that the fluid passing through the microchannel (210) collides with the wall surface of the outflow part (103) is reduced, so that the graphene itself is not pulverized. More preferably, the length of the microchannel may be in 2 mm to 60 mm.

As a result of analyzing the flow inside the high pressure homogenizer (100) through the flow field simulation, it has been confirmed that the energy consumption shown in the high pressure homogenizer is divided into energy losses at the microchannel inlet (secondary loss), the microchannel interior (intuition loss) and the microchannel outlet (secondary loss). Specifically, it has been confirmed that the energy consumption is large while the flow area (channel cross-sectional area) changes at the microchannel inlet (front end channel side) and the microchannel outlet (back end channel side), and the energy consumption inside the microchannel is within about 5% of the entire energy consumption. Based on this, it has been confirmed that even if the length of the microchannel (210) is increased, the resulting decrease of the energy consumption and the flow rate is insignificant and the shear stress required for graphene exfoliation is applied over the entire length of the microchannel (210).

Also, it has been confirmed that the case where the length of the microchannel (210) is 30 mm or more has the same effect as the case where the graphene exfoliation process is repeated 15 times in the high pressure homogenizer having a length in the microchannel (210) of 2 mm. Therefore, by increasing the length of the microchannel (210), it is possible to reduce the number of microchannel passage times, thereby increasing the productivity.

Referring to FIGS. 4 and 5, the microchannel (210) may have a cross section (A) (channel cross section), which is perpendicular to the moving direction of the object for homogenization, of a rectangular shape. Also, the microchannel (210) may have a cross section of a rectangular shape in which a width (length in the x-axis direction) is greater than a height (length in the y-axis direction). In addition, the microchannel (210) has preferably a ratio between width and height of 2:1 or more, and particularly, the microchannel (210) may be formed to have a ratio between width and height of 2:1 to 10:1. Furthermore, the width and breadth of the rectangle may be 10 μm to 50000

μm, respectively. In the conventional high pressure homogenizer, the cross section of the microchannel is circular, but in the present invention, the rectangular shape having a larger surface area than the circular shape is used, whereby the cross-sectional area of the flow channel can be increased. Also, the cross-sectional area of the microchannel may be $1.0 \times 10^2$ μm$^2$ to $1.0 \times 10^8$ μm$^2$.

In the method for manufacturing graphene using the high pressure homogenizer (100), the method for manufacturing graphene also comprises a step of supplying a solution containing graphite (G) to the channel module (200) and a step of applying pressure to the channel module (200) to pass the solution containing the graphite (G). The pressure may be in 100 to 3000 bar. In addition, the graphene (GF) dispersion liquid can be recovered from the outflow part (103) and then again reintroduced into the inflow part (101). The reintroduction process may be repeated 2 to 30 times. The reintroduction process may also be repeated using a single high pressure homogenizer or using a plurality of high pressure homogenizers sequentially.

In addition, the method for manufacturing graphene may comprise a step of recovering and drying the graphene from the recovered graphene (GF) dispersion liquid. The recovering step may be carried out by centrifugation, filtration under reduced pressure or pressure filtration. The drying step may be performed by vacuum drying or general drying under a temperature of about 30 to 200° C. Furthermore, the graphene produced according to the present invention has an advantage that is advantageous in expressing characteristics inherent to graphene, since its size is large and uniform.

FIG. 6 is a perspective view showing a second embodiment of a channel module, and FIG. 7 is a simulation result of the portion B in FIG. 6.

In this embodiment, the channel module (200) comprises at least one baffle (230) disposed to partition the microchannel (210) into a plurality of spaces. Also, the baffle (230) is provided to partition the microchannel into two spaces along the width direction (x-axis direction) or the height direction (y-axis direction). Hereinafter, for convenience of explanation, a case where the microchannel is partitioned into a plurality of spaces along the width direction will be described as an example. For example, the channel module (200) is provided so that the object passes through the respective spaces (231, 232, 233, 234) partitioned by the baffles (230).

Referring to the simulation results of FIGS. 5 and 7, the simulation was performed using the channel module (200) as shown in FIG. 3. At this time, the microchannel (210) has a length of 2 mm, a width of 320 μm, and a height of 100 μm.

In addition, the critical shear stress (shear rate) required for graphene exfoliation was based on $10^5$ 1/s. The entire flow channel cross-sectional area of the region A in FIG. 5 is the same as the entire flow channel cross-sectional area of the region B in FIG. 7. That is, the widths and heights of the microchannel (210) shown in FIGS. 5 and 7 are the same. However, in the second embodiment, the flow channel cross-sectional area was partitioned into four (231 to 234) by disposing three baffles (230) at equal intervals along the width direction (x-axis direction) in the microchannel (210). Furthermore, in FIGS. 5 and 7, the graphite dispersion liquids flowing through the microchannels were the same and experimented under the same flow rate condition. However, in order to satisfy the same flow rate condition, the pressure (pump pressure) (about 9.3 bar) applied to the microchannel shown in FIG. 7 is larger than the pressure (about 6 bar) applied to the microchannel shown in FIG. 5.

As a result of the experiment, in the case of the first embodiment without installing any baffle in the microchannel, it has been confirmed that a shear stress lower than the critical shear stress (shear rate) is generated in the central region (211) on the basis of the flow channel cross section. In FIG. 5, a reference numeral (212) (blue region) indicates the exfoliation effective region. As described above, the exfoliation effective region represents a region where a shear stress greater than the critical shear stress (shear rate, $10^5$ 1/s) is generated.

Alternatively, in FIG. 7, it can be confirmed that the exfoliation effective area (blue region) increases (about 23%) as compared with FIG. 5.

According to the present invention, in the process of exfoliating a single layer of graphene from graphite using the high pressure homogenizer, productivity can be improved by increasing the exfoliation effective region in the microchannel.

Specifically, one or more baffles are disposed in the microchannel in order to increase the region where the shear stress (shear rate) above the critical shear stress (for example, $10^5$ 1/s) required for graphene exfoliation is applied. By partitioning the inside of the microchannel by the baffle, it is possible to increase the wall area and to increase the exfoliation effective region showing a large shear stress.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to increase a region where a shear stress above the critical shear stress (for example, $10^5$ 1/s) required for graphene exfoliation is applied through the baffles, and by partitioning the inside of the microchannel by the baffle, it is possible to increase the wall area and to increase the exfoliation effective region.

The invention claimed is:

1. A high pressure homogenizer comprising
    a channel module which comprises a microchannel through which an object for homogenization passes,
    wherein the channel module comprises at least one baffle disposed so as to partition said microchannel into a plurality of spaces and
    the baffle is provided so as to partition the microchannel into two spaces along the width direction or the height direction.
2. The high pressure homogenizer according to claim 1, wherein said channel module is provided so that the object passes through each space partitioned by the baffle.
3. The high pressure homogenizer according to claim 1, wherein said microchannel has a length of 2 mm to 1000 mm.
4. The high pressure homogenizer according to claim 1, wherein the microchannel has a cross section, which is perpendicular to the moving direction of the object for homogenization, of a rectangular shape.
5. The high pressure homogenizer according to claim 4, wherein said microchannel has a cross section of a rectangular shape in which a width is greater than a height.
6. The high pressure homogenizer according to claim 4, wherein said microchannel is formed to have a ratio between width and height of 2:1 to 10:1.
7. The high pressure homogenizer according to claim 1, wherein the microchannel has a cross-sectional area of $1.0 \times 10^2$ μm$^2$ to $1.0 \times 10^8$ μm$^2$.

8. A high pressure homogenizer comprising
a channel module which comprises a microchannel through which an object for homogenization passes,
wherein the channel module comprises a front end channel for supplying the object to the microchannel, a back end channel in which the object passing through the microchannel flows into and at least one baffle disposed so as to partition the microchannel into a plurality of spaces,
the baffle is provided so as to partition the microchannel into two spaces along the width direction or the height direction,
the front end channel is provided so that at least a part of a flow area becomes small along the moving direction of the object and the back end channel is provided so that at least a part of a flow area increases along the moving direction of the object.

9. The high pressure homogenizer according to claim 8, wherein said channel module is provided so that the object passes through each space partitioned by the baffle.

10. The high pressure homogenizer according to claim 8, wherein the microchannel has a constant flow area along the moving direction of the object.

11. The high pressure homogenizer according to claim 8, wherein the microchannel has a cross section, which is perpendicular to the moving direction of the object for homogenization, of a rectangular shape.

12. The high pressure homogenizer according to claim 8, wherein said microchannel has a cross section of a rectangular shape in which a width is greater than a height.

13. A method for manufacturing graphene using the high pressure homogenizer according to claim 1, comprising
a step of supplying a solution containing graphite to the channel module; and
a step of applying pressure to the channel module to pass the solution containing graphite.

14. The method for manufacturing graphene according to claim 13,
wherein said pressure is in 100 to 3000 bar.

* * * * *